United States Patent
Robinson et al.

(10) Patent No.: US 10,252,304 B2
(45) Date of Patent: Apr. 9, 2019

(54) SOIL AND WATER CONTAMINATION REMEDIATION INJECTOR AND METHOD OF USE

(71) Applicants: Lance I. Robinson, Parrish, FL (US); Erik R. Piatt, Lantana, TX (US)

(72) Inventors: Lance I. Robinson, Parrish, FL (US); Erik R. Piatt, Lantana, TX (US)

(73) Assignee: EN RX Chemical, Inc., Argyle, TX (US)

( * ) Notice: Subject to any disclaimer, the term of this patent is extended or adjusted under 35 U.S.C. 154(b) by 0 days.

(21) Appl. No.: 14/310,157

(22) Filed: Jun. 20, 2014

(65) Prior Publication Data
US 2015/0273546 A1 Oct. 1, 2015

Related U.S. Application Data

(60) Provisional application No. 61/837,236, filed on Jun. 20, 2013.

(51) Int. Cl.
| | |
|---|---|
| *B09C 1/08* | (2006.01) |
| *B01F 5/04* | (2006.01) |
| *B01F 5/08* | (2006.01) |
| *B01F 3/08* | (2006.01) |
| *C02F 1/68* | (2006.01) |

(Continued)

(52) U.S. Cl.
CPC ............ *B09C 1/08* (2013.01); *B01F 3/0865* (2013.01); *B01F 5/043* (2013.01); *B01F 5/0496* (2013.01); *C02F 1/685* (2013.01); *B01F 2015/0221* (2013.01); *B09C 2101/00* (2013.01);

(Continued)

(58) Field of Classification Search
CPC ......... B09C 1/002; B09C 1/08; B01F 5/0405; B01F 5/0413; B05B 7/0087; C02F 3/1294; C02F 1/172; A01C 15/00
See application file for complete search history.

(56) References Cited

U.S. PATENT DOCUMENTS 3,643,688 A * 2/1972 Meinert ............... B67D 1/0016
137/556
4,171,710 A * 10/1979 Boynton ............. A01M 7/0092
137/238

(Continued)

OTHER PUBLICATIONS

International Search Report and Written Opinion issued by the International Searching Authority dated Sep. 15, 2015 for corresponding international patent application No. PCT/US2015/036450.

(Continued)

*Primary Examiner* — Krishnan S Menon
*Assistant Examiner* — Waqaas Ali
(74) *Attorney, Agent, or Firm* — Nicholas Pfeifer; Smith & Hopen, P.A.

(57) ABSTRACT

A method of remediating an environmental contaminant and device for performing the same is disclosed herein. The device uses a liquid carrier source with a venturi pump in liquid communication with the liquid carrier source and an output for the venturi pump and at least one injection port in fluid communication with the output of the venturi pump. The injection port injects a remediator, such as an oxidizing material or chemical, into the liquid carrier, which is then contacted with the environmental contaminant and permitted to degrade or dispose of the environmental contaminant.

15 Claims, 6 Drawing Sheets

(51) Int. Cl.
*C02F 1/70* (2006.01)
*C02F 1/72* (2006.01)
*C02F 103/06* (2006.01)
*B01F 15/02* (2006.01)

(52) U.S. Cl.
CPC ............... *C02F 1/70* (2013.01); *C02F 1/72* (2013.01); *C02F 2103/06* (2013.01); *C02F 2209/005* (2013.01)

(56) References Cited

U.S. PATENT DOCUMENTS

| | | | | |
|---|---|---|---|---|
| 4,397,422 A * | 8/1983 | Gwyn | ............... | B05B 7/30 222/136 |
| 5,393,417 A * | 2/1995 | Cox | ............... | B01F 5/0646 138/45 |
| 5,427,693 A | 6/1995 | Mausgrover et al. | | |
| 5,985,149 A * | 11/1999 | Raetz | ............... | B09C 1/10 166/246 |
| 6,120,008 A * | 9/2000 | Littman | ............... | A61L 2/18 261/76 |
| 6,293,294 B1 * | 9/2001 | Loeb | ............... | B01F 5/0405 137/1 |
| 7,040,839 B1 * | 5/2006 | Mazzei | ............... | A01G 25/06 405/43 |
| 7,704,389 B2 * | 4/2010 | Koons | ............... | B09C 1/002 210/220 |
| 7,875,173 B1 * | 1/2011 | Barnes | ............... | A61H 33/14 210/167.1 |
| 7,887,762 B1 * | 2/2011 | Cresap, Jr. | ............... | C01B 13/10 210/170.07 |
| 8,033,797 B2 | 10/2011 | Kehrmann et al. | | |
| 2003/0150933 A1 * | 8/2003 | Sands | ............... | A01G 7/06 239/172 |
| 2007/0036024 A1 * | 2/2007 | Kubala | ............... | B01F 5/043 366/163.2 |
| 2007/0187848 A1 * | 8/2007 | Sabadicci | ............... | B01F 5/0413 261/76 |
| 2008/0277164 A1 | 11/2008 | Kapila et al. | | |
| 2009/0090666 A1 * | 4/2009 | Koons | ............... | B09C 1/002 210/170.07 |
| 2009/0304449 A1 | 12/2009 | Kerfoot | | |

OTHER PUBLICATIONS

International Preliminary Report on Patentability issued by the International Bureau dated Dec. 29, 2016 for corresponding international patent application No. PCT/US2015/036450.

* cited by examiner

SOIL AND WATER CONTAMINATION REMEDIATION INJECTOR AND METHOD OF USE

CROSS REFERENCE TO RELATED APPLICATION

This application claims priority to U.S. Provisional Patent Application No. 61/837,236, entitled "Soil and Water Contamination Remediation Injector and Method of Use", filed on Jun. 20, 2013, the contents of which are herein incorporated by reference.

FIELD OF INVENTION

This invention relates to remediation injection systems for in situ or ex situ remediation of contaminated soil and/or ground water. More specifically, the invention provides a novel method and device for injecting chemicals and/or biological material into soil or water using for remediation of contaminated soil and/or ground water.

BACKGROUND OF INVENTION

Soil contamination, such as by industrial activity and agricultural chemicals, is a serious concern throughout the world. The contamination may be a result of spills, accidents, or improper disposal of waste. The problem of soil contaminated by organic pollutants such as hydrocarbons, polynuclear aromatics, organo-chlorinated products is becoming increasingly more dramatic in industrialized countries, not only in terms of interventions on pollution of soil and underground water, but the necessity to use contaminated lands for industrial and civil use. There are many sources of pollution and various characteristics of soil subjected to contaminants. Contaminants in the soil can adversely impact the health of animals and humans when they ingest, inhale, or touch contaminated soil, or when they eat plants or animals that have uptaken contaminants from soil. Animals ingest and come into contact with contaminants when they burrow in contaminated soil. For example, many of the widely used pesticides on agricultural lands are potentially carcinogenic. The U.S. Environmental Protection Agency (EPA) identified 15 such chemicals from the 27 most commonly used. Remediation methods include ex situ methods such as excavation of affected soils and subsequent treatment at the surface, and in situ methods which treat the contamination without removing the soil.

Prior to determining the appropriate remediation, the contamination site must be identified, including delineating the extent of the contamination of both soil and groundwater, as the effectiveness of the in situ chemical oxidation technology is site specific. Further, the contaminants, and the characteristics of the contaminants, must be identified, including amounts and concentrations. Based on the contamination, the geology, hydrology and hydrogeology are determined. The injection of oxidants into the groundwater may cause contamination to spread faster than normal, depending on the contaminant and the site's hydrogeology. For example, some metal contaminants increase solubility in an oxidizing environment or reducing environment, thereby increasing contamination migration rates. Once the site analysis is complete, a remedial action plan may be determined.

Solidification and stabilization technology that relies on the reaction between a binder and soil to stop/prevent or reduce the mobility of contaminants. For example, a reactive wall is assembled for remediation of contaminated underground water using granular iron has been in use as reactive medium. In one variation, a mixture of iron and ferrous sulfide is used to remediate soils of halogenated hydrocarbons. In another, a tiered iron wall or column, comprising in at least three zones of graduated sizes of iron particles as reactive medium is used for halogenated hydrocarbons. Iron ($Fe°$) undergoes oxidation, forming redox couples thereby de-halogenating and oxidizing the contaminants. Another variation uses Portland cement or other hydraulic ligand to bind the contaminants in location and physically block the contaminant inside the cementitious matrix preventing further migration of the contaminant into the surrounding environment. The technology has a good success record but suffers from deficiencies related to durability of solutions and potential long-term effects. In addition $CO_2$ emissions due to the use of cement are also becoming a major obstacle to its widespread use in solidification/stabilization.

Excavation or dredging is used to remove contaminated soil, and may also be used to aerate the soil to remove volatile organic compounds (VOCs). Bio-remediation, through bioaugmentation and biostimulation of the excavated material, has shown promise for remediation of semi-volatile organic compounds (SVOCs). Chemical oxidation has also been utilized in the remediation of contaminated soil. This process involves the excavation of the contaminated area into large bermed areas where they are treated using chemical oxidation methods. However, biological remediation is limited to biodegradable compounds and compounds at non-toxic concentrations; in addition the long period of time needed to complete remediation adversely affects the biological systems, limiting use of the technology.

Solubilization and recovery, or surfactant enhanced aquifer remediation, injects hydrocarbon mitigation agents or surfactants into the soil to speed desorption and recovery of bound up contaminants, such as hydrocarbons. Some variations of solubilization and recovery use pollutants' affinity, either chemically or physically, to bind finer particles of the sediment. These particles can be separated from the remaining soil using differential separation techniques through size, density and surface properties. The separated, fine particles are a small fraction of soil, but contain the majority of pollutants. However, this process requires large volumes of surfactant and also possesses difficulty in recovering the surfactants.

In situ organic pollutants removal includes extraction, such as using lipophylic solvent and treating the purified soil with water to remove the residual solvent (D'Angeli, et al., PCT/EP2002/007495). In situ bioremediation has also been used by boring injection holes in the contaminated soil and set casing into the hole to receive the treatment biological materials. This remediation is expensive, cumbersome, requires large equipment, and does not provide a fine adjustment of the remediation process because it relies upon a few large holes and not many small ones to tightly control the treatment area. High pressure gas and oxygen have been added to the hole to drive the biological materials out into the surrounding soil to effect treatment. In some cases this approach uses high pressure and large volumes which have caused contaminants to migrate to previously uncontaminated areas.

In situ oxidation involves the injection of strong oxidants, such as hydrogen peroxide, ozone gas, potassium permanganate or persulfates, into the soil. Each type of oxidant is effective for a different group of contaminants. Among these three oxidants, hydrogen peroxide and ozone are the common selections used to treat petroleum hydrocarbons, benzene, toluene, ethyl-benzene and total xylenes (BTEX) impacted soil and groundwater. Permanganate is believed to have limited effectiveness for BTEX, especially for benzene. The success of in situ chemical oxidation is dependent on effectively delivering chemical oxidants to the contaminant. Upon contact with organic contamination the chemical oxidants will convert them to carbon dioxide, and water in the case of hydrocarbons.

Injection success is a function of pressure and time and time often constitutes difficulty. Traditional injection is laborious, difficult and often the difficulty leads to injection problems like short circuiting to the surface (day lighting) or lack of confidence in injectate placement, which are addressed by the present invention.

SUMMARY OF THE INVENTION

In order to overcome these disadvantages, an innovative venturi system has been designed to introduce oxidizing chemicals. The venturi principle also uses much less power than injection pumps (peristaltic, diaphragm, screw, piston, plunger, or centrifugal pumps), and much less power than compressors, blowers or positive displacement pumps for gas injection. The valves and setup provide sufficient control to utilize the jet pump set up. The Automated Remedial Low Power Injection System utilizes delivered water pressure to inject various reagents (oxidants, catalysts, reduction agents, augmentations, nutrients, binders, surfactants, buffers, pH modifiers, strippers) into the ground in a controlled manner with little power consumption. Due to the automation, this is completed with little effort, and due to the control system it is done with a power scale of 0.0042 Kwhr.

The system uses a venturi pump to mix remediation materials, such as oxidizing chemicals or biological remediation organisms. In some cases, the oxidizing chemicals create dissolved oxygen using 35% $H_2O_2$. When combined in water and added to the soil matrix, the released oxygen elevates dissolved oxygen to support biological reductive organisms. This feature allows for an effective use of peroxide and eliminates difficulty and pressure problems associated with conventional peroxide applications.

The delayed calorie release allows the reagents to be applied at very low pressure. The goal is to elevate groundwater to cover the vadose zone and use head pressure to naturally migrate reagent through groundwater void space. It is important to realize that the successful delivery of the chemical oxidants to the impacted groundwater is the primary factor that influences overall performance.

The system is comprised of a venturi pump in fluid communication with at least one remediation system storage container, and a controller. The venturi pump allows liquids or gases to be pumped into the ground, thereby reducing the number of devices needed to one device, for any type of injectate. Advantageously, the venturi pump can be used to mix liquids and gases, liquids and solids, liquids and liquids, and liquids and biologicals, i.e. the liquid carrier can be mixed with the injectate. In such instances, the injectate is added using an injection port disposed in the venturi tubing. For example, to inject air the venturi tubing narrows thereby speeding up the flow of the liquid carrier, followed by an increase in the pipe diameter to decrease the venturi speed. The injection port is disposed in the narrowed tubing, allowing the gas to be sucked in through the injection port due to differential pressure, and forming a mixture of liquid carrier and gas at the increased diameter piping. The system alternatively uses multiple jet pumps to increase the number of components in the mixture. Where multiple jet pumps are used, the pumps are operated in series or parallel.

The injection port or ports are optionally valves. Exemplary valves include actuated valves, butterfly valves, trunnions, ball valves, plug valves, globe valves, solenoid valves, needle valves, check valves, gate valves, angle seat piston valves, angle valves, ceramic disc valves, piston valves, and pinch valves. Solenoids (latching) and other valves, such as ASCO MU8263A627 ⅜ valve, Rain Bird K80920 Latching solenoid with standard valve body, Peter-Paul Electronics Inc. model 22P9DELM 12/DC, BC valve 2106X-402LV-B373CN, Irritrol DCL latching solenoid and standard valve body, Pneumadyne S15MML-20-12-2B, Alcon 04EA003A14PCA Solenoid Valve are particularly useful. The number of valves is determined by the application. For example, from 1 to 250 may be wired to the controller and manifolded together. Valves can operate at the same time or completely independently or as little or as often as needed.

The controller is a programmable timing controller or programmable logic controller, herein a PLC, to actuate liquid valves. However, other controllers may be used, as would be apparent to one in the art, such as a basic relay controller or an individual timed valve controller. The most practical and controllable design incorporates a DC controller capable of operating for several months on a 9v alkaline battery such as a Toro DDCWP-4, Rainbird TBOS, Direct Logic DL-06 by Koyo, Control Solution Inc VPN-2290, Hunter XC Hybrid model XCH600, Automation Direct C0-00DR-D MICRO PLC, DATAQ DI-159 PLC, Sensaphone web 360, Sensaphone SCADA 3000, Sensaphone Express II, Remote control technology Wireless Data Controller part #: 3104. The controller operates the injection ports, which are selected based on chemical compatibility with the reagents to be selected. In some embodiments, the injection ports use a relatively small jet pump that operate between 0.1 and 2 gpm. However, other pumps may be used, based on the desired applications, and as would be apparent to one of skill in the art. Alternatively, the injection ports utilize the venturi injection system described above. These options offer a standard injection method while consuming a negligible amount of power.

Other devices can be added as a measure of control including pressure gauges, pressures switches or transducers, float switches, rotameters, flow meters, and other meters known in the art.

Because the device uses a venturi jet pump, the device may use any fluid that possesses an environmental benefit, including air, nitrogen, oxygen, carbon dioxide and ozone, and liquids. The liquid(s) and gas(es) change the subsurface environment in any way, as one or multiple components, which may be branded or unbranded reagents or chemicals, slurries or pure fluids. Useful reagents and chemicals include bioremediation reagents, in situ chemical reduction reagents, in situ flushing reagents, nanotechnology-based environmental remediation reagents, permeable reactive barriers, soil washing reagents, and solvent extraction reagents.

Exemplary bioremediation reagents include, microorganisms (bioaugmentation), such as Regenesis: Bio-Dechlor INOCULUM Plus® (*Dehalococcoides* sp.), amendments (biostimulation), Cl Solutions, such as CL-Out®, Munox SR®, Petrox®, Petrox DN®, Petrox EC®, JRW Remediation, such as Wilclear Plus®, Lactoil®, Accelerite®, Chitorem®, Wilclear®, air, oxygen, nitrogen, organic substrates, carbon dioxide, nitrates, and sulfates. Cometabolic aerobic and anaerobic bioremediators, such as bacteria (Mc- Carty, (1994) An overview of anaerobic transformation of chlorinated solvents in Symposium on intrinsic bioremediation of ground water: Washington, D.C., U.S. Environmental Protection Agency, EPA 540/R-94/515, p. 135-142; Alvarez-Cohen & McCarty, (1991) A co-metabolic biotransformation model for halogenated compounds exhibiting product toxicity: Environmental Science and Technology, v. 25, p. 1381-1387; Hanson & Brusseau, (1994) Biodegradation of low-molecular-weight halogenated organic compounds by aerobic bacteria, in Chaundry, G. R., ed., Biological Degradation and Bioremediation of Toxic Chemicals: Portland, Oreg., Dioscorides Press, p. 277-297; Bradley & Chapelle, (1996) Anaerobic mineralization of vinyl chloride in Fe(III)-reducing aquifer sediments: Environmental Science and Technology, v. 23, no. 6, p. 2084-2086; McCarty & Semprini, (1994) Ground-water treatment for chlorinated solvents, in Norris, R. D., and Matthew, J. E., Handbook of bioremediation: Boca Raton, Fla., Lewis Publishers, p. 87-116; Wilson & Wilson (1985) Biotransformation of trichloroethylene in soil: Applied and Environmental Microbiology, v. 49, no. 1, p. 242-243) or enzymes such as methane monooxygenase (MMO), ammonia monooxygenase (AMO), and toluene dioxygenase (Alvarez-Cohen & McCarty, (1991) A co-metabolic biotransformation model for halogenated compounds exhibiting product toxicity: Environmental Science and Technology, v. 25, p. 1381-1387; Henry & Grbic-Galic, (1994) Biodegradation of trichloroethylene in methanotrophic systems and implications for process applications, in Chaundry, G. R., ed., Biological Degradation and Bioremediation of Toxic Chemicals: Portland, Ore., Dioscorides Press, p. 314-344; Arciero, et al., (1989) Degradation of trichloroethylene by the ammonia-oxidizing bacterium *Nitrosomonas europaea*: Biochemical and Biophysical Research Communications, v. 159, no. 2, p. 640-643; Nelson, et al., (1988) Trichloroethylene metabolism by microorganisms that degrade aromatic compounds: Applied and Environmental Microbiology, v. 54, no. 2, p. 604-606; Hopkins, et al., (1993) Microcosm and in situ field studies of enhanced biotransformation of trichloroethylene by phenol-utilizing microorganisms: Applied and Environmental Microbiology, v. 59, p. 2277-2285). Additionally, other electron donors/acceptors, nutrients, sulfate reducing conditions, nitrate reducing conditions, and other compounds, such as Oxygen Release Compound, Advanced (ORC Advanced®), ORC Advanced® Pellets, Catalina Bio Solutions (Cool-Ox®), soil bean oil, vegetable oil, olive oil, Micro-blaze®, ETech: Carbstrat®, Nitrichlor®, oxidized materials, fermentation, methanogenesis, and reductive dechlorination are useful. An exemplary organic substrate is ETEC: Carbstrate™ Electron Donor Substrate. Examples of other electron donors/acceptors, include 3-D Microemulsion®, 3-D Microemulsion Factory Emulsified®, Hydrogen Release Compound (HRC®), Hydrogen Release Compound [eXtended release formula] (HRC-X®), and Hydrogen Release Compound Prime.

Useful in situ chemical reduction and in situ flushing remediators include zero valent iron (ZVI), ferrous iron, sodium dithionite, sulfide salts (calcium polysulfide), hydrogen sulfide, EHC® ISCR Reagent and surfactant in situ chemical oxidation. Useful surfactants include ETech: Petrosolv®, sodium stearate, sodium lauroyl sarcosinate, perfluorononanoate, perfluorooctanoate, octenidine dihydrochloride, cetyl trimethylammonium bromide (CTAB), cetyl trimethylammonium chloride, (CTAC) cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldimethylammonium bromide, polyoxyethylene glycol alkyl ethers, such as octaethylene glycol monododecyl ether and pentaethylene glycol monododecyl ether, polyoxypropylene glycol alkyl ethers, glucoside alkyl ethers, such as decyl glucoside, lauryl glucoside, and octyl glucoside, polyoxyethylene glycol octylphenol ethers, such as Triton X-100, polyoxyethylene glycol alkylphenol ethers, such as nonoxynol-9, glycerol alkyl esters such as glyceryl laurat, polyoxyethylene glycol sorbitan alkyl esters such as polysorbate, and dodecyldimethylamine oxide, Ecovac: Surfac, EFR®, ISCO-EFR®, and COSOLV®. Other useful reagents include hydrogen peroxide, calcium peroxide, magnesium peroxide, sodium percarbonate, such as Regenesis: RegenOx®, catalyzed hydrogen peroxide, Fenton's reagent, Fenton's-like reagent (chelated iron), modified Fenton's reagent, potassium permanganate, such as RemOx S® (Carus Corp., St. Peru, Ill.), sodium permanganate such as GeoCleanse™, RemOx L® (Carus Corp., St. Peru, Ill.), Cap 18® (Carus Corp., St. Peru, Ill.), CAP 18 ME® ® (Carus Corp., St. Peru, Ill.), and PermOx Plus® (FMC Corp., Philadelphia, Pa.), sodium persulfate, such as Regenesis, PersulfOx®, PersulfOx® SP, PerOxy Chem, and Klosur®, ozone, such as C-Sparge™, and GWS: MaxOx™. Nanotechnology: Applications for Environmental Remediation include nanoscale zero-valent iron (nZVI), titanium dioxide ($TiO_2$), zinc oxide (ZnO), cerium oxide ($CeO_2$), iron oxide ($Fe_3O_4$), self-assembled monolayers on mesoporous supports (SAMMS™), ferritin, dendrimers, carbon nanotubes, metalloporphyrinogens, and swellable organically modified silica (SOMS).

Permeable Reactive Barriers include zero-valent iron (ZVI), biosparging, slow release oxygen compound, mulch and other vegetative materials, apatite, zeolite, slag, organophilic clay, solid carbon sources, and ZVI-carbon combinations.

Examples of soil washing reagents include leaching agent, surfactant, such as those described above, and chelating agent. Examples of solvent extraction reagents include acid extraction, such as hydrochloric acid using Rinsate, sodium hydroxide, lime, and flocculent, organic solvents, and carbon dioxide.

Also the carrier liquid is not limited to water to provide fluid motive force. The device is also designed to inject fluids as subpart to the final mixture (injectate) to provide an environmental benefit. For example, the carrier liquid or subpart of injectate is optionally recycled liquid or contaminated groundwater.

The injection device serves many remedial environments, including any type of well (whether vertical, angled or horizontal) of any construction, open hole, trench, excavation, or other environmental remedial setup including ex situ treatments via injection or application via the device. This provides an improvement over former existing technologies for both lower power and versatility in reagent selection.

Lastly, the use of multiple jet pumps can similarly increase the number of components in the mixture by operation in series or parallel. Multiple jet pumps do not consume additional power and adds to the capabilities and versatility of the system.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

A device for introducing components to remediate environmental contaminants, and a method of remediating such environmental contaminants is provided. The system and method rely on a Venturi pump to efficiently provide remediation materials to an environmental substrate which has been deemed contaminated.

As used herein, "biological materials", means organisms useful for degrading, metabolizing, or otherwise remediating an environmental contaminant. "Nutrients" are chemicals and/or other media used to promote the growth and/or sustaining of the "biological materials".

As used herein, the singular forms "a," "an" and "the" include plural referents unless the context clearly dictates otherwise. Thus, for example, reference to "a biological material" includes a mixture of two or more materials and the like.

As used herein, "about" means approximately and is understood to refer to a numerical value or range of ±15% of the numerical. Moreover, all numerical ranges herein should be understood to include all integer, whole or fractions, within the range.

As used herein "substantially" means almost wholly within the specified characteristics. Where the term is used to designate a purity amount, substantially pure means at least 90% pure, more preferably more than 95% pure, and most preferably more than 99.9% pure.

As used herein "venturi pump" means a device which relies on the Venturi effect, i.e. an increase in fluid flow and concurrent reduction in fluid pressure due to a reduction in the cross section of the system containing the fluid.

As used herein "substrate" means a material containing an environmental contaminant. Examples of substrates include soil, clay, and water sources, such as ponds and lakes.

As used herein "oxidizing chemical" means a chemical that possesses the capacity to undergo a reaction in which electrons are obtained from another material identified as an environmental contaminant.

As used herein "reducing chemical" means a chemical that possesses the capacity to undergo a reaction in which electrons are lost to another material identified as an environmental contaminant.

As used herein "binding chemical" refers to a chemical that has the ability to interact with another chemical, thereby forming a complex with the chemical.

As used herein "port" refers to an opening that fits onto a tube.

As used herein "electrical pump" refers to a device that uptakes a fluid and discharges the fluid at a different flow velocity, and which operates using based on electrical inputs.

Example 1

Figure 1:
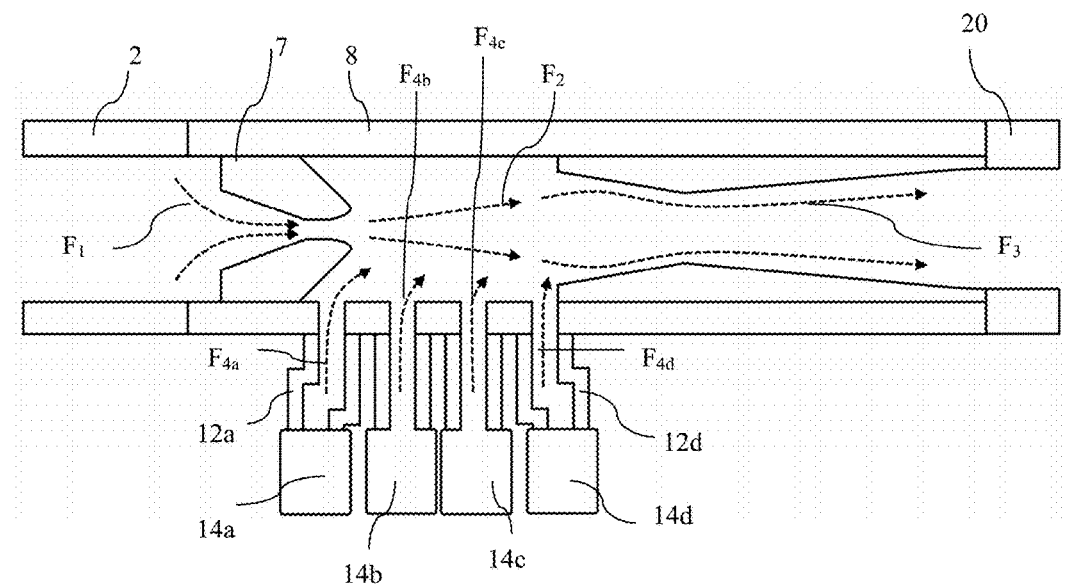
FIG. 1 is a schematic illustration of a first embodiment of the venturi pump and reagent connections.
Figure 2:
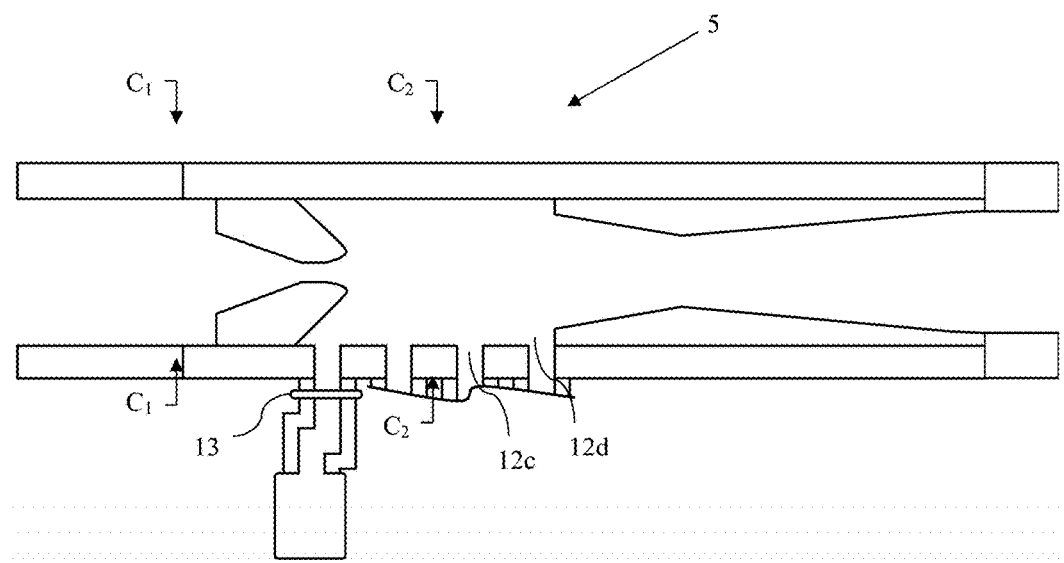
FIG. 2 is a schematic illustration of the venturi pump.

The injection system, seen in FIG. 1, is composed of input fluid tube 2, venturi pump 5 (Mazzie Eductor model 283, Mazzei Injector Company, LLC, Bakersfield, Calif.), and remediation solution output tube 20. Venturi pump 5 is comprised of entry nozzle 7 having a first circumference $C_1$ which is substantially similar to the circumference of input liquid tube 2, and narrows to a second circumference $C_2$, thereby forming mixer 8. Second circumference $C_2$ expands at diffuser 9, and ends at exit nozzle 10, as seen in FIG. 2. Remediation reagents are stored in one or more storage containers, such as storage containers 14a, 14b, and 14c. Remediation reagent input lines join the storage container to mixer 8, thereby providing fluid communication between the storage container and the mixer of venturi pump 5. As seen in FIG. 1, first remediation reagent input line 12a connects first storage container 14a to mixer 8; second remediation reagent input line 12b connects second storage container 14b to mixer 8, and third remediation reagent input line 12c connects third storage container 14c to mixer 8. Optionally, remediation fluid valve 13 controls the input of a remediation reagent into mixer 8.

Figure 3:
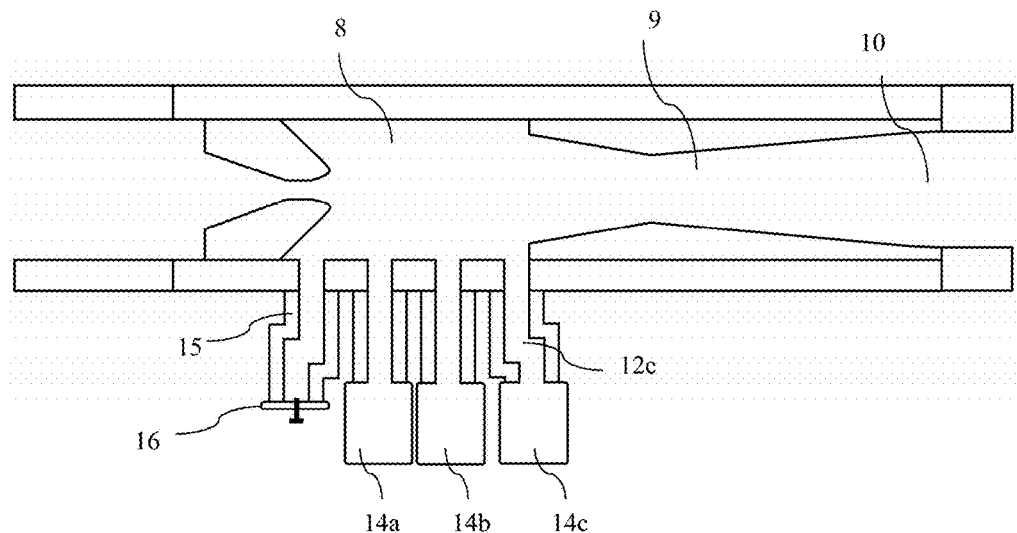
FIG. 3 is a schematic illustration of a second embodiment of the venturi pump and reagent connections along with an aeration pipe.
Figure 4:
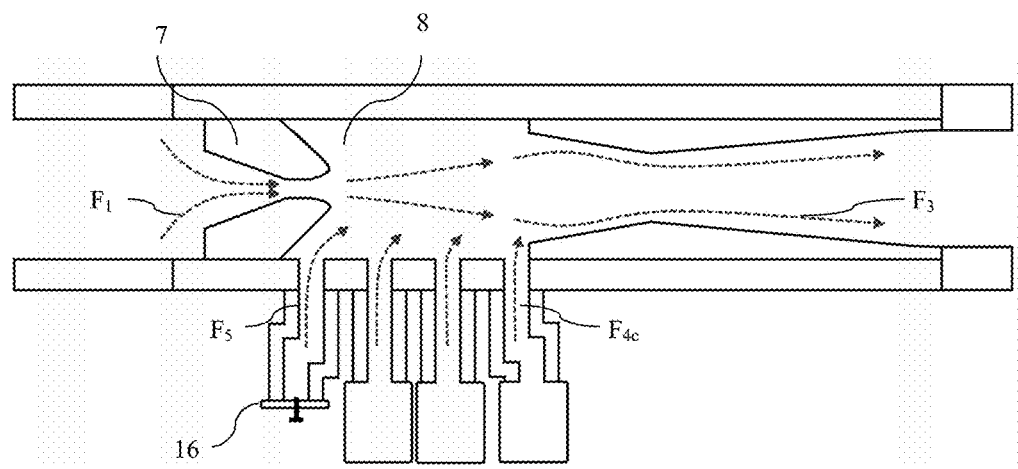
FIG. 4 is a schematic illustration of the venturi pump and reagent connections along with an aeration pipe, showing liquid flow through the second embodiment.

In the provided example, first carrier fluid flow $F_1$ enters entry nozzle 7, and becomes increasingly constricted thereby increasing the velocity of the fluid to second carrier fluid flow $F_2$. The increase in velocity results in a vacuum in mixer 8, allowing the remediation reagent or reagents to be uptaken with little or no additional motive force, i.e. a pump is not required though a pump may be used if desired, shown as flow $F_{4a}$ through $F_{4d}$. Optionally, a valve controls uptake of the remediation reagent into mixer 8. In some variations, one of the remediation reagent input lines provides air intake into mixer 8, as seen in FIG. 3, thereby aerating the remediation solution containing the carrier fluid and any remediation reagents. The air intake is optionally air input line 15, which can include one-way valve 16. As seen with the reagents, the flow of carrier fluid, $F_1$, results in a vacuum, and the vacuum draws ambient air through one-way valve 16 and into the carrier fluid via flow $F_5$, as seen in FIG. 4. The reagents and air are mixed together in mixer 8 due to the flow of fluid through the venturi pipe.

After the carrier fluid mixes with the remediation reagents in mixer 8, the fluid flows through diffuser 9, where the carrier fluid velocity drops down to third carrier fluid flow $F_3$ as the circumference expands to circumference $C_2$. Carrier fluid then exits venturi pump 5 via exit nozzle 10 into remediation solution output tube 20, whereby the remediation solution is carried to an in situ remediation injection site.

Example 2

Figure 5:
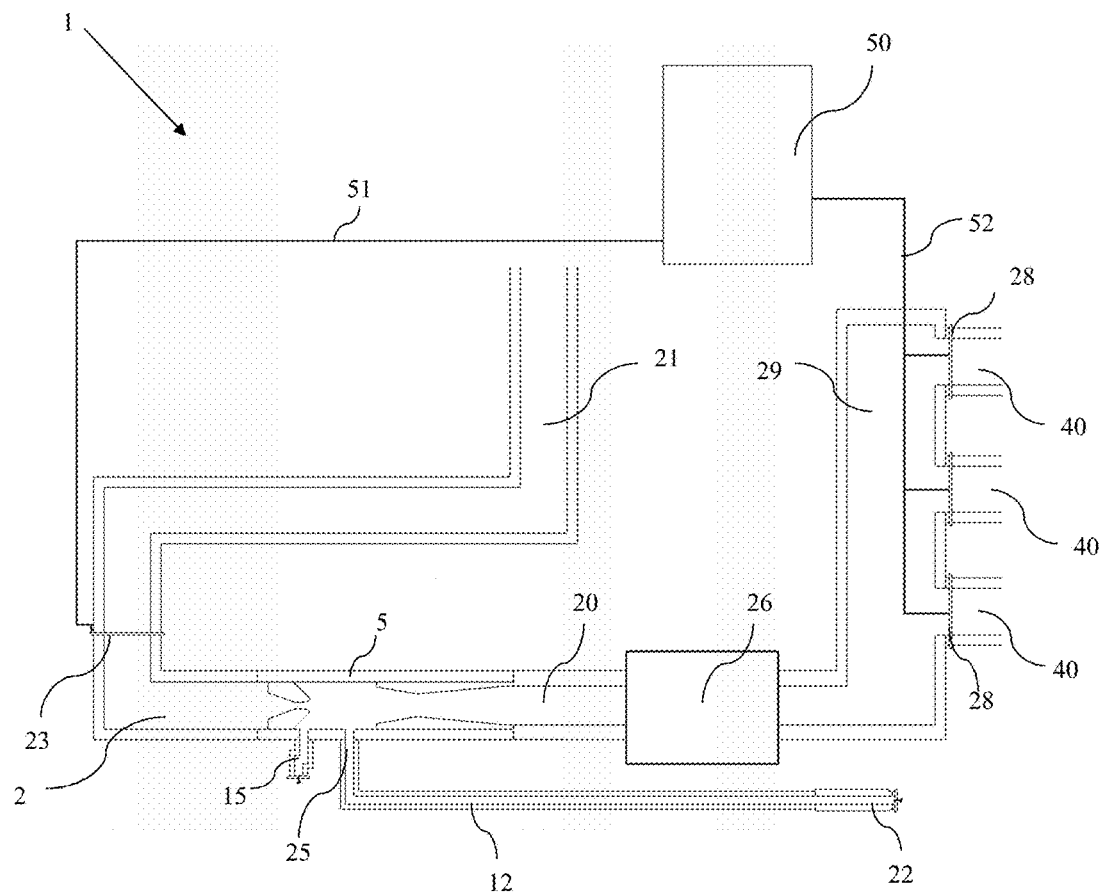
FIG. 5 is a schematic illustration of a third embodiment of the venturi pump attached to the injection system, including the venturi pump and injection ports.

Injection system 1, seen in FIG. 5, is composed of venturi pump 5 (Mazzie Eductor model 283, Mazzei Injector Company, LLC, Bakersfield, Calif.), connected to carrier liquid input 21 and injection pump 26. Carrier liquid permits transfer of remediation reagents to the in situ remediation injection site, and may be water. Carrier liquid input 21 includes master input valve 23, controlling the input of carrier liquid into venturi pump 5, in some embodiments. Venturi input line 21a is in fluid communication with input fluid tube 2.

Remediation reagent is transported from reagent storage containers (not shown) via storage port 22 through reagent transport tubing 12 and to injection port 25, which is in fluid communication with mixer 8.

Injection pump 26 is in fluid communication with remediation solution output tube 20, allowing control over flow of the remediation solution. In some embodiments, injection pump 26 provides the remediation solution to manifold 29, where a bank of valves 28, such as latching solenoids or non-latching AC solenoids, are used to control flow of reagent-mix to multiple injection locations. Remediation output line 40 connects injection system 1 to each individual injection location.

Figure 6:
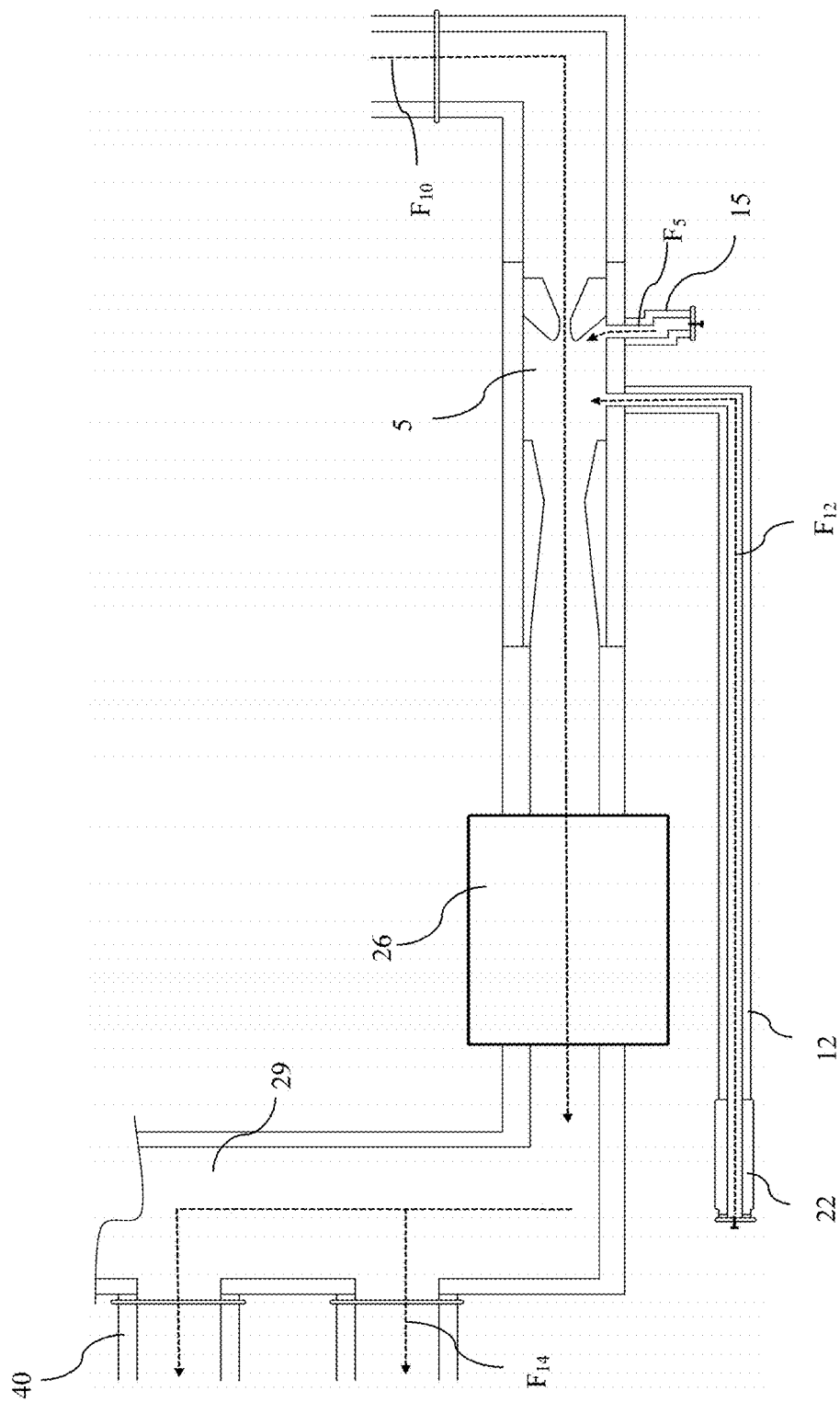
FIG. 6 is an enlarged schematic illustration of the injection system, showing liquid flow through the third embodiment.

Carrier fluid flow $F_{10}$ shown in FIG. 6 enters the injection system via carrier liquid input 21 and flows into venturi input line 21a and through master input valve 23, such that the carrier fluid is delivered at a selected pressure and thereby provides fluid motive force through the jet pump that educts a reagent into the water stream. Carrier fluid flow $F_{10}$ enters input fluid tube 2 and venturi pump 5. Reagent concurrently flows from a reagent storage container through reagent transport tubing 12 and to injection port 12, which is connected to venturi pump 5, shown as flow $F_{12}$ in FIG. 6. The reagent mixes with carrier fluid in mixer 8 through the venturi effect, forming remediation solution. The resulting remediation solution is transferred through injection pump 26 for transfer to the field treatment injection well via remediation output line 40 as solution flow $F_{14}$.

Where more than one reagent are used, multiple injection ports may be provided, as illustrated in example 1, or the reagents may be combined prior to entering storage port 22.

In the example provided, a bank of valves 28, such as latching solenoids or non-latching AC solenoids, are used to control flow of reagent-mix to multiple injection locations. The valves join at manifold 29, which is connected to the injection pump, thereby allowing the remediation solution multiple exit locations from the device at remediation output line 40. The bank of valves operate in a determined sequence, such as a cyclic sequence, to allowing injection of reagent-mix to the various field treatment injection wells.

Figure 7:
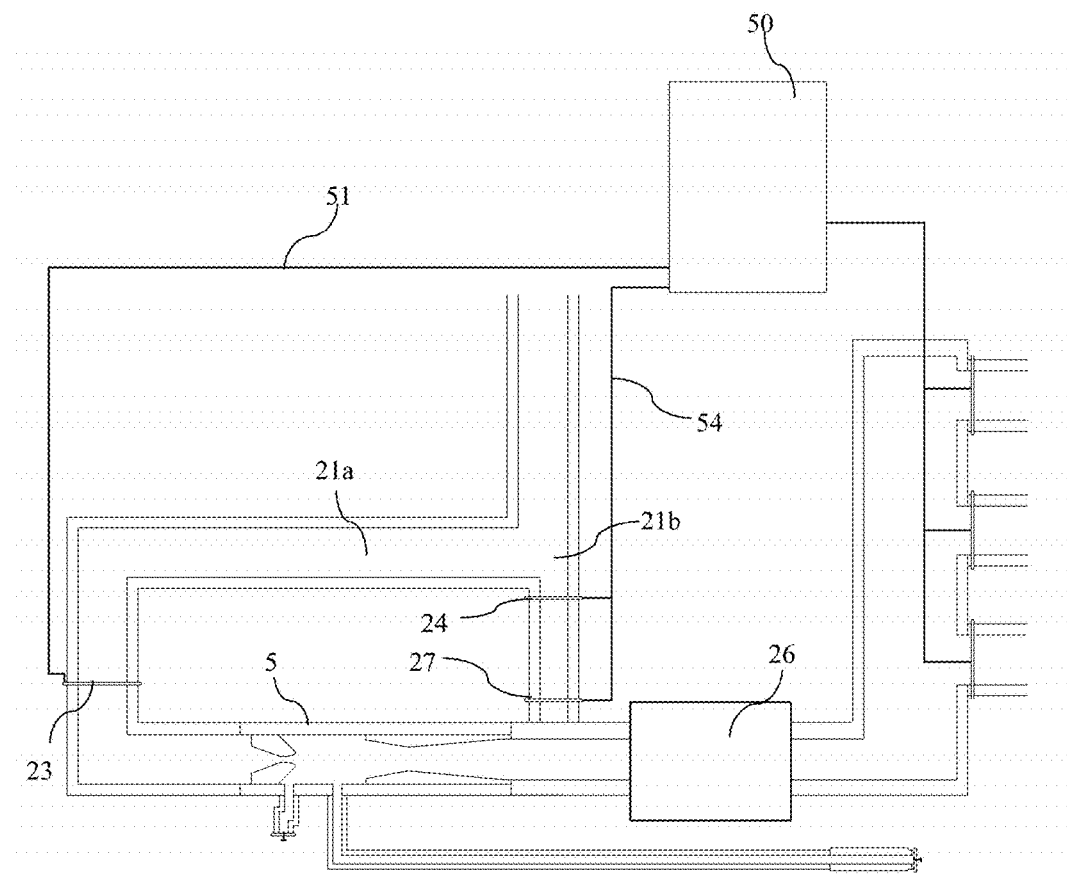
FIG. 7 is a schematic illustration of the injection system, including optional electrical communication lines from a controller.

Controller 50, seen in FIG. 7, is electronically connected to master input valve 23 by electrical input valve communication 51, and at least one valve 28 by electrical output valve communication 52. In some embodiments, the master valve 23 and valve 28 can be replaced with a master relay and external pump with variable flow control (variable frequency drive (ac), or variable voltage control (dc)) which provides the same function. For systems controlled remotely, a transceiver is electronically connected to the controller, which adjusts the voltage provided to the pumps, thereby controlling the flow rates through the device. The flow rates are defined by as little (0.1 gpm) or as much (2500 gpm) flow, depending on the size of the venturi pump. In some embodiments, controller 50 is also connected to injection pump 26, which operates between 0.1 and 2 gpm.

Carrier liquid input 21 optionally splits into venturi input line 21a and deactivation line 21b, seen in FIG. 7. Deactivation line 21b can include carrier liquid pressure switch 27 (Ashcroft Inc., Stratford, Conn.) and flow switch 24, which are designed to deactivate system if carrier liquid flow is blocked. Deactivation line 21b is in fluid communication with remediation solution output tube 20, providing a bypass of venturi pump 5 and the remediation reagents. Pressure switch 27 and a flow switch 24 are optionally electronically connected to controller 50 via deactivation communication 54.

Figure 8:
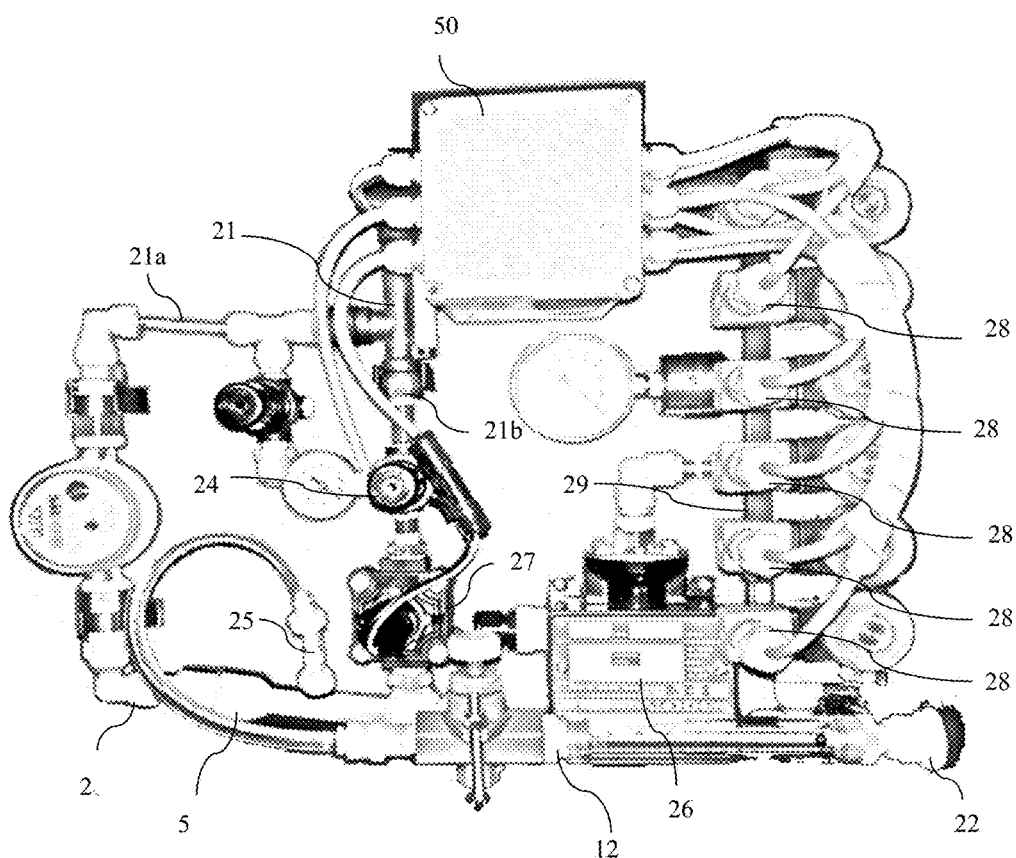
FIG. 8 is an image showing the injection system.

Remediation output line 40 connects to at least one field treatment injection well in the soil, thereby providing the oxidizing chemicals to the soil or environmental contaminant. Optionally, pressure gauges may be included at certain locations along the system to provide user feedback on the operation of the system, as seen in FIG. 8.

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between.

What is claimed is:

1. A device for applying an environmental contaminant remediator, comprising:
    a fluid source coupled to an input fluid tube;
    the input fluid tube delivering fluid from the fluid source to a mixing chamber;
    the mixing chamber having an input end, an output end, and a central longitudinal axis;
    the input end of the mixing chamber having an entry nozzle that converges towards the central longitudinal axis in a direction towards the output end of the mixing chamber, such that a distal end of the entry nozzle has a diameter less than a diameter of the mixing chamber;
    the output end of the mixing chamber having an exit nozzle that converges towards the central longitudinal axis in a direction away from the input end of the mixing chamber, such that a distal end of the exit nozzle has a diameter less than the diameter of the mixing chamber;
    a diffuser having an inner diameter that diverges away from the central longitudinal axis of the mixing chamber in a direction away from the input end of the mixing chamber, wherein the inner diameter of the diffuser is directly adjacent to the converging nozzle;
    at least one remediation reagent storage container in fluid communication with the mixing chamber via a remediation reagent input line;
    at least one injection well disposed in soil, wherein the at least one injection well is in fluid communication with the output tube.

2. The device of claim 1, further comprising an injection port disposed on the mixing chamber for controlling the flow of reagent fluid from the remediation reagent input line, wherein the injection port is an actuated valve, a butterfly valve, a trunnion, a ball valve, a plug valve, a globe valve, a solenoid valve, a needle valve, a check valve, a gate valve, an angle seat piston valve, an angle valve, a ceramic disc valve, a piston valve, or a pinch valve.

3. The device of claim 2, wherein the injection port is an DC solenoid valve or an actuated valve.

4. The device of claim 1, further comprising a controller in electrical communication with at least one valve, wherein the at least one valve is disposed on the remediation reagent input line, between the remediation reagent storage and the mixing chamber, on the output tube, on the input fluid tube, or a combination thereof.

5. The device of claim 4, wherein the controller is a programmable timing controller or a programmable logic controller.

6. The device of claim 4, wherein the controller is in electrical communication with an electrical pump, wherein the electrical pump is disposed on the output tube or on the output end of the mixing chamber.

7. The device of claim 1, wherein the at least one remediation reagent storage is a plurality of remediation reagent storage devices.

8. The device of claim 1, further comprising:
a plurality of remediation reagent storage containers, wherein each container has at least one port and a remediation reagent input line having an input and an output, wherein each input line is fluidly coupled to the port of one of the storage containers.

9. The device of claim 1, further comprising an electrical pump in fluid communication with a reagent in the remediation reagent storage device.

10. The device of claim 9, wherein the electrical pump is in electrical communication with a controller.

11. The device of claim 1, further comprising an aeration device, wherein the aeration device further comprises:
an aeration tube having an input and an output, wherein the input is in fluid communication with ambient air and the output delivers ambient air to the mixing chamber; and
a one-way valve disposed on the aeration tube, thereby controlling the flow of ambient air to the mixing chamber.

12. The device of claim 1, further comprising
a deactivation line having an input and an output, wherein the deactivation line input is disposed on the input fluid tube and the deactivation line output is disposed on the output tube; and
a pressure switch disposed in liquid communication with the deactivation line.

13. The device of claim 12, further comprising at least one valve disposed on the deactivation line.

14. The device of claim 1, further comprising a manifold disposed on the output tube, and wherein at least one injection line is disposed on the manifold.

15. The device of claim 14, further comprising at least one valve disposed on the manifold or on the at least one injection line, and adapted to control fluid flow from the manifold through the at least one injection line.

* * * * *